(12) United States Patent
Arias Arias et al.

(10) Patent No.: US 11,325,061 B2
(45) Date of Patent: May 10, 2022

(54) LIQUID FILTER AND TANK FILTER SYSTEM INCLUDING A LIQUID FILTER

(71) Applicant: Robert Bosch GmbH, Stuttgart (DE)

(72) Inventors: Jose Luis Arias Arias, Madrid (ES); Miguel Castejon Lopez, Madrid (ES); Miguel Martinez Gomez, Valencia (ES); Daniel Hollstegge, Madrid (ES); Milo Stich, Madrid (ES)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 16/633,712

(22) PCT Filed: Jul. 18, 2018

(86) PCT No.: PCT/EP2018/069457
§ 371 (c)(1),
(2) Date: Jan. 24, 2020

(87) PCT Pub. No.: WO2019/020442
PCT Pub. Date: Jan. 31, 2019

(65) Prior Publication Data
US 2020/0206663 A1    Jul. 2, 2020

(30) Foreign Application Priority Data
Jul. 25, 2017 (DE) .......................... 102017212768.6

(51) Int. Cl.
*B01D 35/027* (2006.01)
*B01D 29/05* (2006.01)
(Continued)

(52) U.S. Cl.
CPC .......... *B01D 35/027* (2013.01); *B01D 29/05* (2013.01); *B01D 29/52* (2013.01); *B01D 35/005* (2013.01);
(Continued)

(58) Field of Classification Search
CPC ...... B01D 29/05; B01D 29/52; B01D 35/005; B01D 35/027; B01D 35/0273;
(Continued)

(56) References Cited

U.S. PATENT DOCUMENTS 4,402,827 A * 9/1983 Joseph ............... B01D 35/0273
210/167.08
5,494,575 A * 2/1996 Kitajima ................ B01D 29/23
184/6.24

(Continued)

FOREIGN PATENT DOCUMENTS

| CA | 1120867 A | 3/1982 |
|----|-----------|--------|
| CN | 2348906 Y | 11/1999 |

(Continued)

OTHER PUBLICATIONS

International Search Report dated Oct. 23, 2018 of the corresponding International Application PCT/EP2018/069457 filed Jul. 18, 2018.

*Primary Examiner* — Audrey B. Walter
(74) *Attorney, Agent, or Firm* — Norton Rose Fulbright US LLP; Gerard Messina (57) ABSTRACT

A liquid filter for removing particles from a liquid, in particular from fuel or a urea solution, includes a first filter medium, a second filter medium, and a supporting frame including a supporting frame wall. The supporting frame wall includes first and front faces facing away from each other. The first filter medium is fastened to the first front face in a fluid-tight manner, and the second filter medium is fastened to the second front face in a fluid-tight manner. The supporting frame, the first filter medium, and the second filter medium enclose an interior space. The supporting frame includes a passage opening, a first filter element being situated in the interior space and being connected, in a (Continued)

fluid-conducting manner, to an exterior space of the liquid filter using the passage opening.

16 Claims, 5 Drawing Sheets

(51) Int. Cl.
  *B01D 29/52* (2006.01)
  *B01D 35/00* (2006.01)
  *F01N 3/20* (2006.01)
  *F02M 37/50* (2019.01)
(52) U.S. Cl.
  CPC ....... *B01D 35/0273* (2013.01); *F01N 3/2066* (2013.01); *F02M 37/50* (2019.01); *B01D 2201/0415* (2013.01); *F01N 2610/02* (2013.01); *F01N 2610/03* (2013.01); *F01N 2610/1406* (2013.01); *F01N 2610/1426* (2013.01)
(58) Field of Classification Search
  CPC ............ B01D 2201/0415; F02M 37/50; F01N 3/2066; F01N 2610/02; F01N 2610/03; F01N 2610/1406; F01N 2610/1426
  See application file for complete search history.

(56) References Cited

U.S. PATENT DOCUMENTS

| | | | |
|---|---|---|---|
| 5,817,236 A * | 10/1998 | Chiba | F02M 37/50 210/344 |
| 2003/0042185 A1* | 3/2003 | Dockery | F02M 37/50 210/132 |
| 2004/0144705 A1 | 7/2004 | Yamada et al. | |
| 2011/0192786 A1* | 8/2011 | Nagai | F02M 37/44 210/443 |
| 2012/0012517 A1* | 1/2012 | Khalil | B01D 35/0273 210/295 |
| 2014/0096849 A1* | 4/2014 | Akagi | B01D 29/11 137/545 |
| 2016/0045845 A1* | 2/2016 | Stausberg | B01D 29/52 210/339 |
| 2018/0257006 A1* | 9/2018 | Hayashi | F02M 37/44 |

FOREIGN PATENT DOCUMENTS

| | | |
|---|---|---|
| CN | 2880219 Y | 3/2007 |
| CN | 101267880 A | 9/2008 |
| CN | 202315497 U | 7/2012 |
| DE | 10100145 A1 | 7/2002 |
| DE | 102011087532 A1 | 6/2013 |
| DE | 102014217339 A1 | 2/2016 |
| EP | 2108425 A1 | 10/2009 |
| WO | 2012153202 A1 | 11/2012 |

* cited by examiner

LIQUID FILTER AND TANK FILTER SYSTEM INCLUDING A LIQUID FILTER

CROSS-REFERENCE TO RELATED APPLICATIONS

The present application is the national stage of International Pat. App. No. PCT/EP2018/069457 filed Jul. 18, 2018, and claims priority under 35 U.S.C. § 119 to DE 10 2017 212 768.6, filed in the Federal Republic of Germany on Jul. 25, 2017, the content of each of which are incorporated herein by reference in their entireties.

FIELD OF THE INVENTION

The present invention relates to a liquid filter for removing particles from a liquid, in particular from fuel or a urea solution. The present invention also relates to a tank filter system including such a liquid filter.

BACKGROUND

So-called tank filter systems are known from the related art. In such tank filter systems, a liquid filter is directly situated in a tank for the liquid to be cleaned. The liquid to be cleaned can be, for example, fuel such as diesel or gasoline, or a urea solution in an SCR (selective catalytic reduction) system. Such SCR systems are, for example, utilized in the reduction of nitrogen oxide portions in the exhaust gas of internal combustion engines. Due to the arrangement of the liquid filter directly in the liquid tank, valuable space can be saved, for example, in motor vehicles.

Such a tank filter system including a liquid filter is known, for example, from U.S. Pat. App. Pub. No. 2004/0144705 A1.

SUMMARY OF THE INVENTION

The present invention is directed to the finding that, for such tank filter systems or liquid filters in such tank filter systems, multiple parameters are to be optimized preferably simultaneously. On the one hand, the filtration area is to be preferably large, so that a preferably long service life up to the necessary replacement of the liquid filter is achieved. In other words, the filtration area is to be configured for removing a preferably large amount of particles from the liquid to be cleaned, before a filter medium of the liquid filter becomes clogged or filled with particles in such a way that a pressure drop occurs, which is no longer acceptable, between a raw side (for example, the outer side) of the liquid filter and a clean side (for example, an interior space) of the liquid filter. Moreover, the production costs for such a liquid filter are to be preferably low. This is preferably effectuated using a preferably simple and accelerated or fast manufacturing process. Finally, the liquid filter is to meet all these parameters while requiring preferably little space, since the space available, for example, in motor vehicles, for such liquid filters is limited.

It has been shown that, in the case of conventional liquid filters for tank filter systems, either the service life is insufficient and, therefore, a relatively short maintenance interval is necessary, or the space occupied by the liquid filter in the tank takes away valuable volume, in the tank, for the liquid to be cleaned. In other words, conventional liquid filters for tank filter systems occupy relatively large volumes in the tank.

A need can therefore arise to provide a liquid filter for a tank filter system, which, while requiring preferably little space in the tank, achieves a long service life and a high filter efficiency and, in the process, occupies a preferably small volume and is preferably easily and cost-effectively manufacturable.

According to a first aspect of the present invention, a liquid filter is provided for removing particles from a liquid. The liquid to be filtered can be, for example, a fuel such as gasoline or diesel, or also an aqueous urea solution. The liquid filter encompasses a first filter medium, a second filter medium, and a supporting frame including a supporting frame wall. The supporting frame wall includes a first front face and a second front face facing away from the first front face. The first filter medium is fastened to the first front face in a fluid-tight manner, and the second filter medium is fastened to the second front face in a fluid-tight manner. The supporting frame, the first filter medium, and the second filter medium enclose an interior space. The supporting frame encompasses a passage opening, which can be designed, for example, to be duct-like. A first filter element is situated in the interior space, which is connected to an exterior space of the liquid filter in a fluid-conducting manner using the passage opening.

Due to the provided embodiment, the available filtration area is considerably enlarged using simple means due to the fact that the interior space is utilized for accommodating a filter element in addition to the first filter medium and the second filter medium, namely the first filter element. Therefore, there is no loss of volume or space in the tank, since the first filter element is situated in the interior space made up of the first filter medium, the second filter medium, and the supporting frame. The liquid filter formed in this way can also be easily manufactured and, therefore, is cost-effective to produce.

Within the scope of this application, the expression "enclose an interior space" means, in particular, a closing-off, in a fluid-tight manner, with respect to an exterior space of the liquid filter in the sense that liquid from the exterior space (for example, the raw side) can enter the interior space (for example, the clean side of the liquid filter) from this exterior space only when the liquid passes either through the first filter medium or through the second filter medium. Liquid can also enter the interior space due to the fact that, when it passes through the passage opening, from there, it enters the first filter element and, upon passing through the first filter element, enters the interior space. In the process, particles contained in the liquid are removed either at the first filter medium, at the second filter medium, or at the first filter element, so that the liquid entering the interior space is also cleaned.

The first filter element can be, for example, nondetachably connected to the supporting frame. The term "nondetachably" is to be understood, in this case, to mean "not nondestructively detachable."

Within the scope of this application, the passage opening can be larger than a microscopic pore through which the liquid can enter or pass. For example, this passage opening is so large that unfiltered liquid can pass through the passage opening and enter the first filter element.

The passage opening can directly connect, for example, an interior of the first filter element to an exterior space of the liquid filter in a fluid-conducting manner. In other words, the interior of the first filter element is connected to the exterior space, in this case, without a further intermediate layer of further elements, for example, sieves or filter membranes.

The liquid filter can be designed, for example, in such a way that the passage opening takes up at least 0.5% of the area of the first filter medium facing the interior space and at most 10% of the area of the first filter element facing the interior space. For example, the passage opening can have a diameter of at least 0.5 mm and at most 50 mm. The passage opening can be designed, for example, to be circular, oval, or also having an essentially rectangular cross section. It can also be designed in the form of multiple slots. For example, a length of the cross section of the passage opening can be at least 10 mm and a width of the cross section of the passage opening can be at least 0.5 mm.

In the calculation of the area of the first filter medium, a fractal, microscopic surface is not to be applied.

Moreover, it can be provided, for example, that a projection of the first filter element onto the first filter medium along a surface normal of the first filter medium covers more than 50% of the area of the first filter medium within the boundary of the supporting frame. In other words, the shadow cast by the first filter element covers more than 50% of the area of the first filter medium. Preferably, more than 80% of the area and, very particularly preferably, more than 95% of the area is covered.

As a result, a particularly large increase of the active filtration area is effectuated.

The first filter medium and the second filter medium can be situated, for example, essentially in parallel to each other. In other words, the supporting frame wall has essentially the same height overall. Other embodiments are also conceivable, however.

It can be provided that the first filter medium and/or the second filter medium are/is fastened to the first front face and to the second front face, respectively, in a fluid-tight manner using a friction welding process or a laser welding process. Alternatively or additionally, it can be provided that the first filter medium and/or the second filter medium are/is connected to the particular associated front faces of the supporting frame wall in an injection molding process. In this case, for example, the relevant filter medium can function as an insert of an injection molding system, the supporting frame being injection-molded from plastic.

The liquid filter can encompass an outlet for the cleaned liquid located in the interior space. For this purpose, a fluid-conducting duct located between the first front face and the second front face can be situated in the supporting frame wall. The fluid-conducting duct functioning in such a way as a liquid outlet can have, for example, a cross section, which is at most 10% of the area of the first filter medium, preferably at most 5% of the area of the first filter medium. For example, the passage opening can have a diameter of at least 0.5 mm and at most 50 mm. The passage opening can be designed, for example, to be circular, oval, or also having an essentially rectangular cross section. It can also be designed in the form of multiple slots. For example, a length of the cross section of the passage opening can be at least 10 mm and a width of the cross section of the passage opening can be at least 0.5 mm.

In principle, the liquid flow can also take place in the opposite direction. In this case, the interior space is the raw side and the liquid is cleaned during the passage through the first or the second filter medium or through the first filter element and, in this way, reaches the outer side of the liquid filter, which is then a clean side. The above-described fluid-conducting duct is then an inlet for non-cleaned liquid.

In an example embodiment, the first filter element encompasses a third filter medium. As a result, the effective filtration area is advantageously increased, whereby the service life of the liquid filter is advantageously increased.

The cleaning of the liquid then simply takes place via the passage of the liquid through the third filter medium.

The first filter element can be advantageously designed in such a way that it is formed for the most part, i.e., up to at least 50%, preferably at least 70%, and very particularly preferably at least 90% by the third filter medium.

In an example embodiment, the first filter element encompasses a further supporting frame including a further supporting frame wall, the further supporting frame wall including a third front face, the third filter medium being fastened in a fluid-tight manner to the third front face.

As a result, a particularly simple manufacture of the first filter element is made possible. For example, the third filter medium can be fastened in a fluid-tight manner to the third front face using a welding process or using an injection molding process.

Alternatively, the further supporting frame can also be covered on both sides by the third filter medium. In this case, the further supporting frame can encompass, for example, a fourth front face facing away from the third front face, the third filter medium also being fastened in a fluid-tight manner to the fourth front face.

In an example embodiment, the further supporting frame encompasses a closed, fluid-impermeable bottom on a side facing away from the third front face, the third front face facing upward in a normal installation position of the liquid filter. The direction indicator "upward" means, in this case, a direction counter to the direction of gravity.

Due to this arrangement, the service life of the first filter element is advantageously increased. This is the case because the liquid to be cleaned passes from the interior of the first filter element upward through the third filter medium into the interior space. Particles located in the liquid are removed on the side of the third filter medium facing the interior of the first filter element. For example, the particles can then be released from the third filter medium, due to vibrations, for example, of an engine, or due to pressure pulsations of a pump drawing in the liquid, and drop downward along the direction of gravity onto the bottom of the further supporting frame. The particles remain there and, therefore, no longer block the filter pores of the third filter medium.

In an example embodiment, the end of the passage opening facing the exterior space of the liquid filter is delimited or surrounded or bordered by the first front face of the supporting frame wall. In other words, the passage opening points in the direction of the surface normal of the first filter medium. Due to this arrangement, the liquid filter can be particularly easily manufactured. Moreover, an entry of liquid into the liquid filter is therefore advantageously possible from only two opposite directions, whereby the liquid filter can make particularly good use of the lateral space available in a tank.

In an example embodiment, the end of the passage opening facing the exterior space of the liquid filter is delimited by the supporting frame wall. In other words, the passage opening is situated within the supporting frame wall and points in a direction, which is essentially perpendicular to the first front face of the supporting frame or is essentially perpendicular to the surface normal of the first filter medium. Therefore, the passage opening is situated between the two front faces of the supporting frame wall. As a result, a particularly simple manufacture of the supporting frame and of the first filter element is made possible. Advantageously, the first filter medium and the second filter medium can also be produced, in this way, as identical components.

In an example embodiment, the first filter element is spaced apart from the area of the first filter medium facing the interior space and/or from the area of the second filter medium facing the interior space. As a result, it is advantageously effectuated that a preferably large effective filtration area is provided. This is the case because, due to the spacing, the first filter medium as well as the area of the first filter element positioned opposite the first filter medium are both effective as a filtration area, or the second filter medium as well as the area of the first filter element positioned opposite the second filter medium are both effective as a filtration area.

The spacing can be, for example, at least 25% of the thickness of the first or the second filter medium, preferably at least 1-time the thickness of the first or the second filter medium and, very particularly preferably, at least 3-times, at least 5-times, or even at least 10-times the thickness of the first or the second filter medium. Alternatively or additionally, the spacing can be at least 0.3 mm millimeter, preferably at least 0.5 mm, and very particularly preferably at least 1 mm or even at least 3 mm or even at least 6 mm. In this way, the cleaned liquid can advantageously particularly easily flow out, so that the flow takes place preferably uniformly through all filtration areas of the filter media.

In an example embodiment, the first filter medium is designed to be planar. Alternatively or additionally, it can be provided that the second filter medium is designed to be planar. A planar design is understood to mean, in this case, an aspect ratio between the thickness of the first and/or the second filter medium relative to an extension of the particular filter medium in the plane, which is at least 1:5 or 1:10, preferably at least 1:20, or even more preferably at least 1:30.

For example, the first filter medium and/or the second filter medium can be designed in the form of a thin filter membrane having a layer thickness in the range of 5 μm to 3000 μm, preferably of 1000 μm to 2000 μm, for example, having a layer thickness of 1500 In this case, the first and/or the second filter medium can be formed from a single layer. The first filter medium and/or the second filter medium can be formed, for example, from a plastic membrane having a pore size of less than 200 for example, in the range from 5 μm to 100 μm or can include such a membrane, preferably having a pore size from 5 μm to 20 μm. It is also possible, however, that the first and/or the second filter medium are/is made up of a plurality of layers, for example, of a fabric layer having a layer thickness between 100 μm and 400 μm, which faces, for example, the raw side. A further layer, which can be designed as a filtration non-woven or filter felt or as a membrane, has a layer thickness between 800 μm and 1500 μm and a pore size of, for example, 5 μm to 100 μm, preferably from 5 μm to 20 μm. A further layer can also be provided, which faces, for example, the clean side and can be designed as a so-called spunbound layer, in the manner of an endless thread made of a plastic and has a layer thickness from 50 μm to 800 μm. Preferred materials include, in this case, plastic, for example, polyamide, for example, PA6, PA6.6, or polypropylene (PP), or polyethylene (PE).

The first and the second filter medium can be identically designed in terms of configuration and material. They can also differ from each other, however, with respect to their thickness, pore size, and/or material.

Due to such an embodiment of the first filter medium and/or of the second filter medium, the liquid filter can be advantageously designed to be particularly space-saving and compact and is particularly easily manufacturable. In this way, the first and/or the second filter medium can be connected, for example, to the supporting frame using an injection molding process or using a welding process. Moreover, in this way, a sufficiently large interior space is formed for the accommodation of the first filter element.

The third filter medium of the first filter element can also be designed to be planar, similarly to the first filter medium or to the second filter medium. The third filter medium can also be designed, for example, as a thin filter membrane. It can be designed to be single-layered or multilayered. It can have pore sizes between 5 μm and 200 μm, preferably from 5 μm to 20 μm and a thickness between 5 μm and 3000 μm, preferably from 1000 μm to 2000 μm, for example, 1500 μm. In principle, the third filter medium can be designed identically to the first and/or the second filter medium in terms of material and configuration. It can also differ from the first and/or the second filter medium.

Due to the fact that the third filter medium is designed to be planar, the active filtration area of the liquid filter is particularly advantageously enlarged and the service life is extended.

In an example embodiment, a support structure is provided in the interior of the first filter element. As a result, it is advantageously effectuated that the first filter element always has a sufficiently large inner volume, which cannot collapse.

Alternatively or additionally, a spacer element can be situated between the first filter element or the third filter medium on the one side and the first filter medium on the other side. The spacer element can be designed, for example, as a plastic element having a corrugated structure or encompassing spacer ribs. Due to this refinement, a certain spacing is advantageously always achieved between the first filter element and the first filter medium. It is therefore ensured that the filtration area for cleaning the liquid to be cleaned is always maintained and does not diminish due to a mechanical contact between the filter media. It can also be advantageously ensured, as a result, that a sufficiently large gap remains between the mutually facing areas of the filter media for the cleaned liquid to flow out.

In an example embodiment, the support structure encompasses at least one support element that extends essentially in parallel to the first filter medium. A plurality of ribs is situated on the support element and protrude from the support element in the direction of the first filter medium and/or in the direction of the second filter medium. As a result, the support structure in the interior of the first filter element can advantageously perform the task of a type of spacer. Due to the plurality of ribs, it is ensured, preferably across the entire area of the first filter element, that the first filter element or the third filter medium of the first filter element does not collapse and, in this way, the active filtration area is always retained.

In an example embodiment, the supporting frame encompasses a further passage opening, a second filter element being situated in the interior space and being connected to the exterior space of the liquid filter in a fluid-conducting manner using the further passage opening. As a result, a further enlargement of the active filtration area is advantageously effectuated in combination with a consistent space requirement of the liquid filter. In this way, the service life is advantageously increased and/or the volume or the space of the liquid filter can be reduced while the service life remains the same. For example, the further passage opening can be formed on a side of the supporting frame facing away from the first passage opening. For example, in a normal installation position of the liquid filter, a passage opening can point upward and the other passage opening can point downward. The second filter element can be designed similarly to the first filter element.

According to a second aspect of the present invention, a tank filter system includes a liquid filter as described above. Such a tank filter system advantageously has a particularly compact design, has a long service life, and can be manufactured particularly easily and cost-effectively.

Further features and advantages of the present invention will become apparent to those skilled in the art from the following description of exemplary example embodiments, which, however, are not to be considered as limiting the present invention, with reference to the attached drawings.

DETAILED DESCRIPTION

Figure 1:
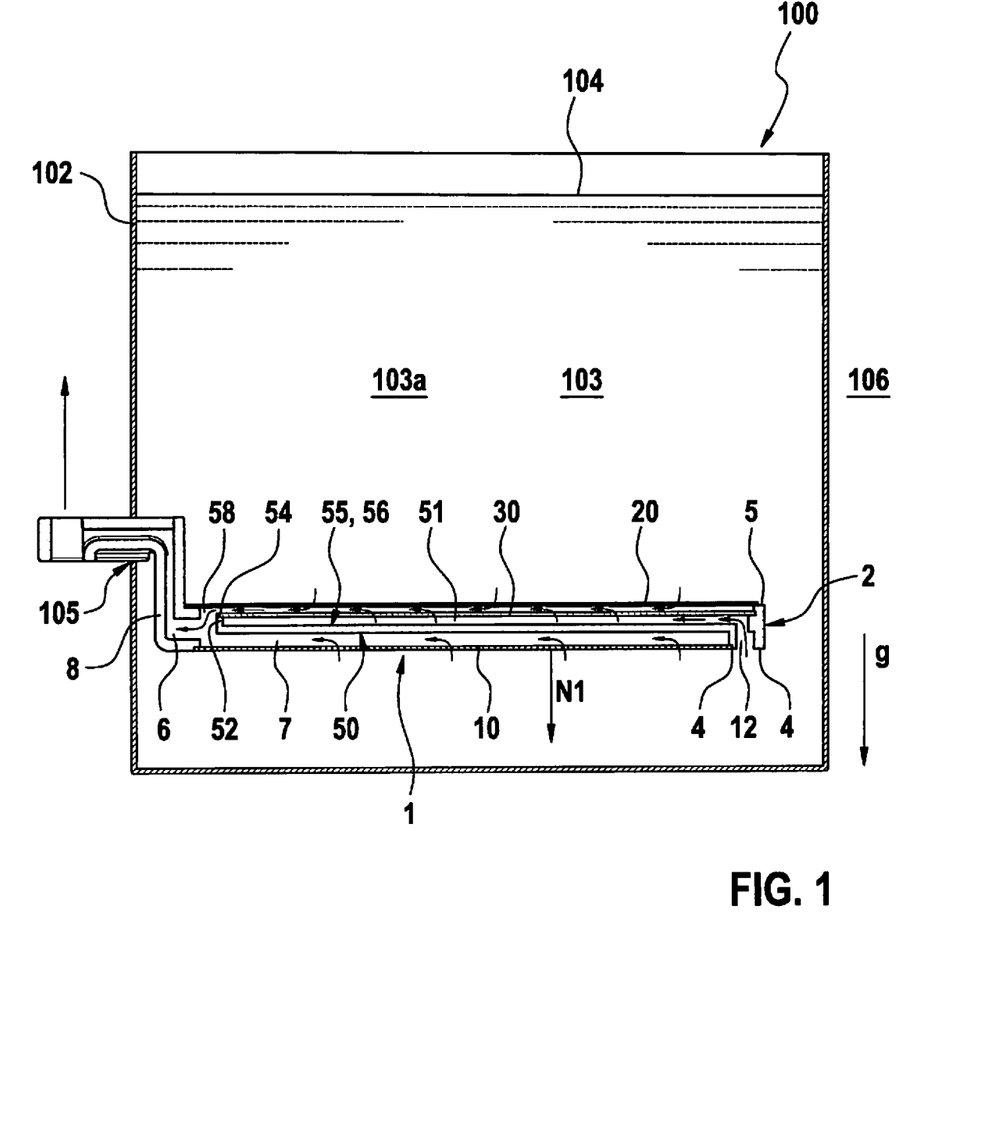
FIG. 1 shows a schematic cross section of a tank filter system according to an example embodiment of the present invention.

FIG. 1 shows a tank filter system 100. Tank filter system 100 encompasses a tank 102 for a liquid 104. Liquid 104 can be, for example, a fuel, for example, diesel or gasoline. It is also possible that liquid 104 is an (aqueous) urea solution, for example, for an SCR system for the exhaust gas aftertreatment of an internal combustion engine.

Liquid 104 in tank 102 is unfiltered. Therefore, a raw side 103a of tank filter system 100 is present in tank 102. Tank 102 also encompasses a breakthrough 105, through which cleaned liquid can exit tank 102. Tank 102 is surrounded by an exterior space 106 of tank 102. Moreover, tank 102 encompasses a liquid filter 1 in its interior, i.e., on raw side 103a. Raw side 103a is therefore an exterior space 103 of liquid filter 1. Liquid filter 1 is designed for removing particles from liquid 104. Liquid filter 1 encompasses a first filter medium 10, a second filter medium 20, and a supporting frame 2 including a supporting frame wall 3. Supporting frame wall 3 includes a first front face 4 and a second front face 5 facing away from first front face 4. First filter medium 10 is fastened to first front face 4 in a fluid-tight manner, for example, using a friction welding process, a laser welding process, or an injection molding process. Further known integrally joined fastening options, for example, bonding, can also be used. Second filter medium 20 is fastened to second front face 5 in a fluid-tight manner in a similar way. In this case, supporting frame 2, first filter medium 10, and second filter medium 20 enclose an interior space 7, which is utilized as a clean side.

First filter medium 10 includes a passage opening 12, a first filter element 50 being situated in interior space 7 and being connected, in a fluid-conducting manner, to exterior space 103 of liquid filter 1 using passage opening 12. In other words, first filter element 50 is connected to raw side 103a in a fluid-conducting manner. This connection is, for example, direct in this case, where there are no elements, such as sieves or filter membranes, between interior 51 of first filter element 50 and exterior space 103 of liquid filter 1. Therefore, non-cleaned liquid 104 of raw side 103a is present in interior 51. In the represented example embodiment, passage opening 12 points downward, i.e., in the same direction as a first surface normal N1 of first filter medium 10. In this way, liquid can enter liquid filter 1 only through two diametrically opposed sides (in FIG. 1, from the top and from the bottom). As a result, the lateral extension of liquid filter 1 can be considerably lengthened and extend up to close to the lateral walls of tank 102. In this way, a very large filtration area can be created.

Moreover, it is apparent in FIG. 1 how liquid 104 from tank 102 enters interior space 7 of liquid filter 1 along the arrows from raw side 103a in tank 102 through first filter medium 10 and through second filter medium 20. The liquid located in interior space 7 has therefore been cleaned of particles and, therefore, is located on the clean side of liquid filter 1. Moreover, liquid 104 can enter interior 51 of first filter element 50 through first passage opening 12.

First filter element 50 encompasses a further supporting frame 55 including a further supporting frame wall 52. Further supporting frame 55 can coincide, in sections, with supporting frame wall 3 of supporting frame 2. This is apparent on the right side in FIG. 1 or also in FIG. 3. In this case, for example, at most 25% of the overall extension of further supporting frame wall 52 of further supporting frame 55 coincides with supporting frame wall 3 of supporting frame 2, preferably at most 15% and, very particularly preferably, at most 10% of the overall extension of further supporting frame wall 52.

Further supporting frame wall 52 encompasses a third front face 54. Third filter medium 30 is fastened to third front face 54 in a fluid-tight manner. In this case, third filter medium 30 or first filter element 50 is spaced apart from first filter medium 10. First filter element 50 or third filter medium 30 is also spaced apart from second filter medium 20. In this way, liquid can also enter interior 51 of first filter element 50 through passage opening 12. From there, the liquid can enter interior space 7 of liquid filter 1 through third filter medium 30, upward in FIG. 1 counter to direction of gravity g, i.e., to the clean side. Particles contained in liquid 104 are retained, in this case, in interior 51 of first filter element 50 by third filter medium 30.

Further supporting frame 55 extends in an elongate and flat manner in interior space 7. Its lateral extension (in the figure, from left to right and into the image plane) is, for example, at least 10-times as great as its height in this case (from bottom to top in the figure). Further supporting frame 55 encompasses a bottom 56 at its lower end in the figure, which is not permeable by the liquid, i.e., is fluid-impermeable. Supporting frame 55 can therefore be designed in the shape of a flat dish, further supporting frame wall 52 and bottom 56 delimiting a volume, which is fluid-impermeable downward and toward the sides, except for passage opening 12 situated next to bottom 56. Bottom 56 and further supporting frame wall 52 can be made, for example, of metal or can include metal as material or can be injection-molded from plastic and include, for example, polyamide (PA), polypropylene (PP), or polyethylene (PE), for example, PA6, PA6.6. Bottom 56 and further supporting frame wall 52 can have, for example, a height of at least 3 mm (further supporting frame wall 52), a width of at least 10 mm, and a length of at least 20 mm, for example, a height of 8 mm, a length of 80 mm, and a width of 30 mm. Particles 80, which have been removed from liquid 104 and then drop downward from third filter medium 30, can be collected on bottom 56, as represented in greater detail in FIG. 3. Bottom 56 represents, therefore, a flow-stabilized zone. In this way, the service life of first filter element 50 can be increased with little effort, since the particles collected on bottom 56 no longer block the pores of third filter medium 30.

First filter medium 10 and second filter medium 20 can be situated essentially in parallel to each other. First filter medium 10 and second filter medium 20 can be designed, for example, in the form of thin membranes having a planar extension, or also as a filtration non-woven. Third filter medium 30 can also be formed in the shape of a thin filter membrane or in the form of a filtration non-woven.

A fluid-conducting duct 6, which is suitable for draining the cleaned liquid from interior space 7 and out of tank 102, is situated in supporting frame wall 3, between first front face 4 and second front face 5. A filter outlet 8 in the form of a duct is situated, at fluid-conducting duct 6, on the outer side of liquid filter 1, and is connected to fluid-conducting duct 6 in a fluid-conducting manner and extends through breakthrough 105 of tank 102. Via filter outlet 8, cleaned liquid can therefore be removed from tank 102 through liquid filter 1. The liquid, which has been cleaned in this way, can be routed, for example, to an internal combustion engine or an exhaust gas aftertreatment system.

In order to effectuate the entry of liquid from tank 102 through filter media 10, 20, 30, a low pressure due, for example, to a pump on an internal combustion engine or an exhaust gas aftertreatment system, can be present at filter outlet 8.

In principle, it is conceivable, of course, that liquid filter 1 is also operated in the opposite direction, i.e., non-cleaned liquid is conducted through filter outlet 8 into interior space 7 of liquid filter 1 and then, from interior space 7, enters exterior space 103 of liquid filter 1 through filter media 10, 20, 30. In this case, filter outlet 8 functions, naturally, as a filter inlet for admitting liquid into liquid filter 1.

Figure 2A:
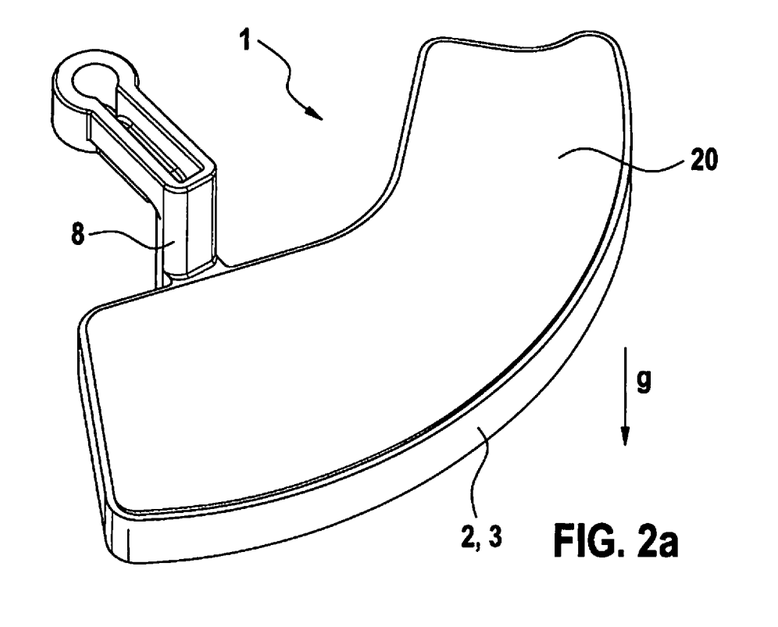
FIGS. 2a-2c show various perspective views of a liquid filter according to an example embodiment of the present invention.
Figure 2B:
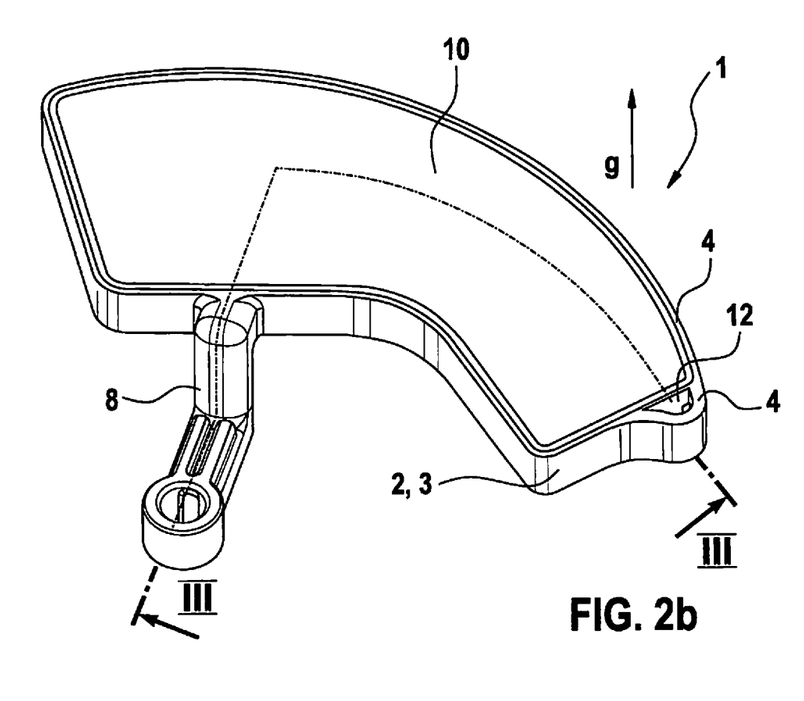

A perspective view of a liquid filter 1 is represented in FIGS. 2a and 2b. FIG. 2a shows a top view of second filter medium 20. FIG. 2b shows a top view of first filter medium 10. Direction of gravity g is characterized by an arrow and relates to a normal installation position of liquid filter 1 into tank 102.

In FIG. 2b, passage opening 12 in supporting frame 2 is apparent. It is readily apparent that passage opening 12 is not merely a pore as in first filter medium 10, but rather an opening, which has a diameter, for example, of at least 0.5 mm or at least 2 mm, preferably a diameter of at least 8 mm, so that non-cleaned liquid 104 can enter first filter element 50, which is not visible here, through passage opening 12. Passage opening 12 is delimited by supporting frame wall 3 and points in the same direction as first front face 4 of supporting frame wall 3. Passage opening 12 is designed in the manner of a widened gap in outwardly facing supporting frame wall 3. First filter medium 10 is fastened, in this case, only to first front face 4 of supporting frame wall 3 adjacent to interior space 7 in the area of the passage opening. In other words, entire first front face 4 of supporting frame wall 3 is not covered by first filter medium 10.

Figure 2C:
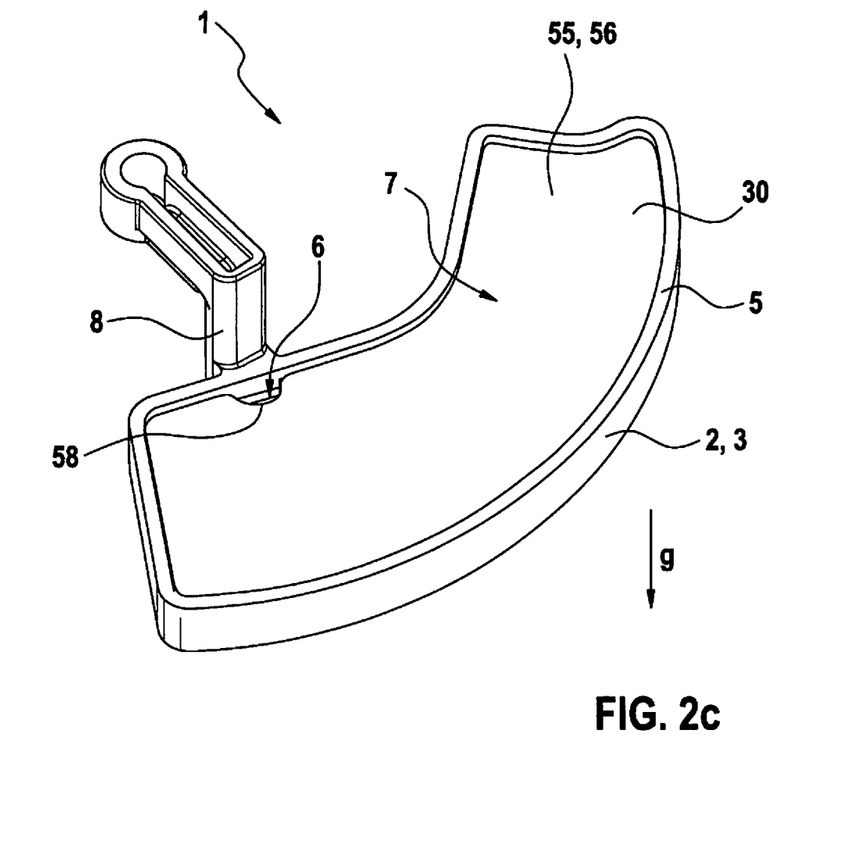

FIG. 2c shows the view from FIG. 2a, second filter medium 20 being omitted here, in order to show the arrangement of first filter element 50 in interior space 7 of liquid filter 1.

For first filter element 50, the top side of third filter medium 30 facing interior space 7 is visible. Third filter medium 30 can be welded, for example, to third front face 54 of further supporting frame 55 or connected, in a fluid-tight manner, to further supporting frame 55 in an injection molding process. In principle, further supporting frame 55 can also be open (i.e., designed without a bottom 56) on its side facing downward in FIG. 1. Third filter medium 30 can also be fastened there. In this case, third filter medium 30 can be designed as one piece or two initially separate filter media are attached to the diametrically opposed front faces of further supporting frame wall 52.

Fluid-conducting duct 6 in supporting frame wall 3 is also indicated in FIG. 2c, which connects interior space 7 of liquid filter 1, i.e., the clean side, to outlet 8.

In FIG. 2c, it is readily apparent that first filter element 50 takes up the greatest portion of the area of interior space 7 in an extension plane perpendicular to direction of gravity g or to the height of liquid filter 1. In the represented example embodiment, the area of first filter element 50 is more than 90% of the area of interior space 7. In principle, it can be provided that first filter element 50 takes up at least 50%, particularly preferably at least 70%, and very particularly preferably at least 85% of the area of interior space 7. In this way, a particularly large additional filtration area is created.

Due to an outflow opening 58, it is ensured that the cleaned liquid in the space between second filter medium 20 and third filter medium 30 can flow out toward filter outlet 8, which can also be referred to as an outlet. This outflow opening 58 is formed by a concave configuration of further supporting frame wall 52 in the proximity of fluid-conducting duct 6.

Supporting frame 2 of liquid filter 1 is designed, in FIGS. 2a-2c, to be curved in the shape of a banana. In this way, it can adapt particularly well to a tank shape.

Figure 3:
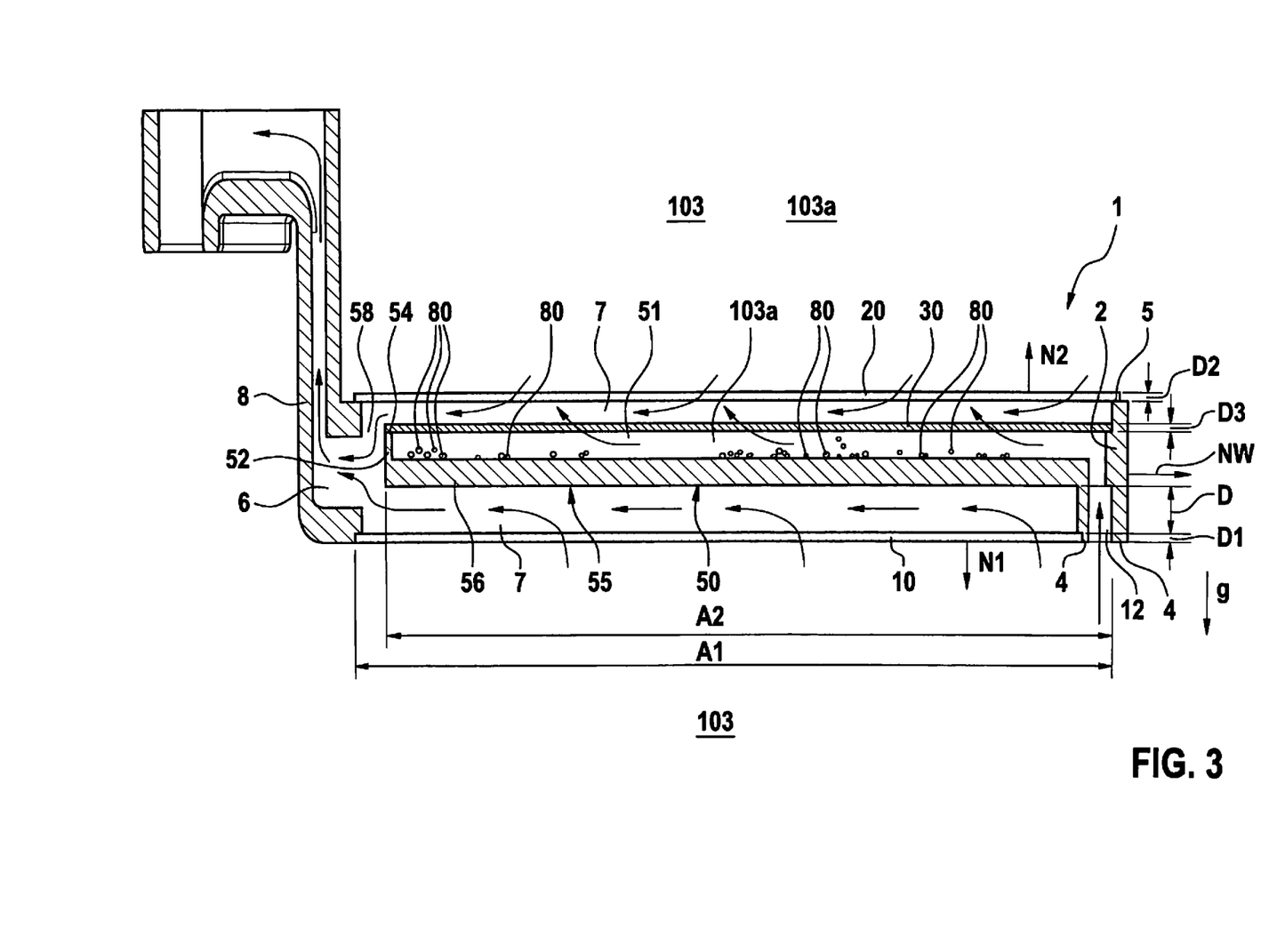
FIG. 3 shows a schematic cross section of the liquid filter from FIGS. 2a-2c, according to an example embodiment of the present invention.

FIG. 3 shows a cross section of the liquid filter from FIGS. 2a-2c. Unfiltered liquid 104, i.e., raw side 103a, is located in interior 51 of first filter element 50 and interior space 7 of liquid filter 1 is the clean side.

Moreover, it is apparent that first filter element 50 (its bottom 56 in this case) is spaced apart from first filter medium 10 by a distance D. Distance D is, for example, at least 25% of thickness D1 of first filter medium 10, preferably at least 1-time of thickness D1 of first filter medium 10 and, very particularly preferably, at least 3-times or at least 5-times or even at least 10-times of thickness D1 of first filter medium 10. In absolute values, distance D can be, for example, at least 0.3 mm, preferably at least 0.5 mm, or even at least 1 mm or at least 3 mm or at least 6 mm. As a result, a particularly high filter efficiency and a uniform outflow of the cleaned liquid is ensured. It is pointed out that first thickness D1 of first filter medium 10 as well as second thickness D2 of second filter medium 20 and third thickness D3 of third filter medium 30 are represented in FIG. 3 in an exaggerated manner. In an example embodiment, the three thicknesses D1, D2, D3 are, for example, maximally 100 μm or maximally 400 μm thick due to the embodiment of filter media 10, 20, 30 as thin filter membranes. In another example embodiment, the three thicknesses D1, D2, D3 of the three filter media 10, 20, 30 are in the range of 1000 μm to 3000 μm, where the three filter media 10, 20, 30 can also be designed to be multilayered.

A height H of supporting frame wall 3 (between front faces 4, 5), however, is, for example, at least 5 mm, preferably at least 8 mm, and very particularly preferably at least 10 mm. For example, the height of supporting frame wall 3 is approximately 10 mm or approximately 20 mm and the three thicknesses D1, D2, D3 are each approximately 1500 μm.

First filter element 50 is also spaced apart from second filter medium 20 (without a reference numeral). The distance between first filter element 50 and second filter medium 10 can be, for example, at least as great as distance D between first filter element 50 and first filter medium 10.

Moreover, it is apparent in FIG. 3 that a first area A1 of first filter medium 10, of which only one dimension is apparent in FIG. 3, is negligibly larger than a second area A2 of first filter element 50. Second area A2 results due to a projection of first filter element 10 along first surface normal N1 of first filter medium 10 onto first filter medium 10, in the manner of a shadow. Only one direction or dimension of second area A2 as well is indicated here. Due to the comparison with FIG. 2c, it becomes clear, however, that first filter element 50 covers at least 50%, preferably at least 70% of first filter medium 10, and very particularly preferably at least 85% of first filter medium 10.

In FIG. 3, it becomes clear that second filter medium 20, whose second surface normal N2 points upward, has a larger area than first filter medium 10. This is due to the fact that passage opening 12 is formed in first front face 4 of supporting frame wall 3 or is delimited by first front face 4 of supporting frame wall 3. The space required for passage opening 12 is therefore missing from first filter medium 10. Of course, passage opening 12 can also be formed in second front face 5 of supporting frame wall 3.

Figure 4:
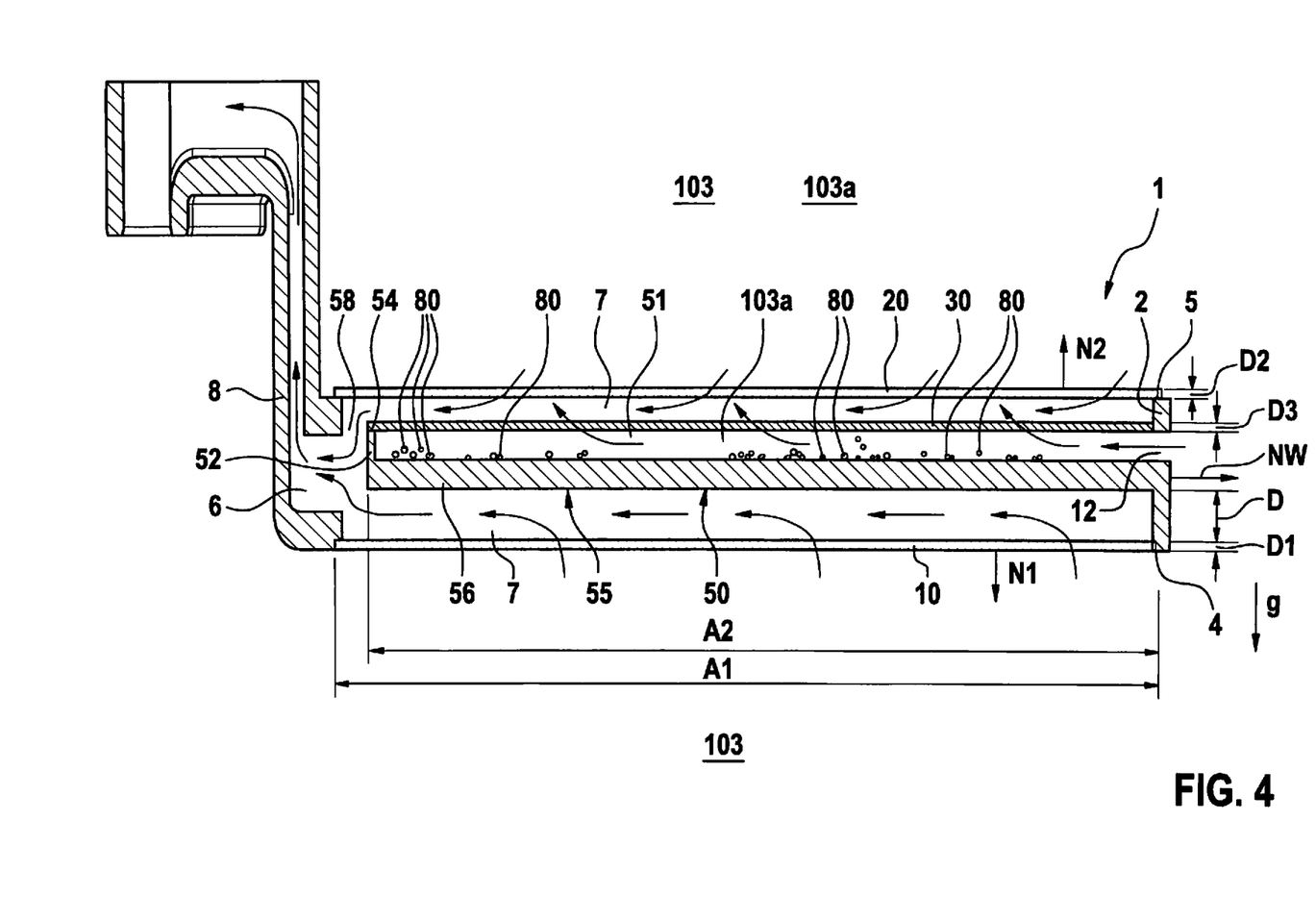
FIG. 4 shows a schematic cross section of a liquid filter, according to another example embodiment of the present invention.

FIG. 4 shows a schematic cross section of a further example embodiment of liquid filter 1. This is designed, in principle, in the same way as that from FIG. 3. In the example embodiment represented in FIG. 4, however, passage opening 12 is formed in supporting frame wall 3. In this way, supporting frame wall 3 can be formed between the two front faces 4, 5. In other words, passage opening 12 points in the direction of supporting frame wall-normal NW. In this case, first filter medium 10 and second filter medium 20 can be produced as identical components. The inflow of non-cleaned liquid 104 to first filter element 50 then takes place from a direction turned by 90° as compared to the inflow of liquid through first and second filter medium 10, 20. In this example embodiment, the cross section and shape of passage opening 12 can be selected in the same manner as in the example embodiment according to FIGS. 1-3. In all example embodiments, passage opening 12 can also be formed by a plurality of slots, whereby the fluid flow into first filter element 50 can be equalized and stabilized. This, in turn, reduces the risk of stirring up already-removed particles.

In FIGS. 3 and 4, particles 80 are apparent, which have fallen from the area of third filter medium 30 facing interior 51 and which collect on bottom 56. Bottom 56 can represent a flow-stabilized zone, so that particles 80 are not stirred up again. Bottom 56 can be designed, for example, as a recess, which improves the stabilization of the flow. Particles 80 can also clump together on bottom 56, so that a stirring-up due to the flowing liquid is made difficult. Particles 80 removed in this way no longer cover the pores of third filter medium 30, whereby the service life of liquid filter 1 increases.

In a further example embodiment (not represented) of the liquid filter, a support structure can be provided in interior 51 of first filter element 50. The support structure is formed, for example, by a support element including a plurality of ribs situated thereon. The support element extends, in this case, essentially in parallel to first filter medium 10 and the plurality of ribs protrude from the support element transversely in the direction toward first filter medium 10 and/or to second filter medium 20. Due to the provision of the support structure, third filter medium 30 is prevented from collapsing during operation and, in this way, reducing the active filtration area in an undesirable way. Due to such a support structure, first filter element 50 can be designed to be very flat, for example, having a height between bottom 56 and third filter medium between 0.25 mm and 8 mm, preferably between 0.5 mm and 5 mm, for example, 0.5 mm or 1 mm or 3 mm.

Moreover, a spacer element (not represented here) can be situated between first filter medium 10 and first filter element 50. This can be made up, for example, of a corrugated plastic. In principle, it is possible that, in individual example embodiments, either only one spacer element or only one support structure is provided. Due to the spacer element and the support structure, the additional filtration area of first filter element 50 is always available and the filtration area is not reduced by the contact or superimposition of filter media 10, 20, 30 or one of the filter media with a diametrically opposed area.

In a further example embodiment (not represented here) of liquid filter 1, in addition to first filter element 50, which is situated at passage opening 12 of first filter medium 10, a similar second filter element including a further passage opening is connected to the exterior space 103 of liquid filter 1 in a fluid-conducting manner. In this case, supporting frame 2 includes the further passage opening. The further passage opening can be designed similarly to passage opening 12. The two passage openings can point, for example, in different directions, for example, one upward and one downward, by reference to FIG. 3. It is also conceivable that both point in the same direction. The second filter element can be designed similarly to first filter element 50. In this way, the second filter element can encompass or include a fourth filter medium, which is designed, for example, similarly to first, second, or third filter medium 10, 20, 30 in the form of a thin membrane or a filtration non-woven.

Tank filter system 100 and liquid filter 1 are, for example, suitable for filtering fuels, such as diesel or gasoline, and in particular for liquids, which are utilized in SCR systems, for example, aqueous urea solution. In principle, tank filter system 100 can also be suitable for filtering water.

What is claimed is:

1. A liquid filter for removing particles from a liquid, the liquid filter comprising:
   a first filter medium;
   a second filter medium;
   a first filter element; and
   a supporting frame that encloses a passage opening and includes a supporting frame wall;
   wherein:
   the supporting frame wall includes a first front face and a second front face facing away from each other;
   the first filter medium is fastened to the first front face in a fluid-tight manner;
   the second filter medium is fastened to the second front face in a fluid-tight manner; and
   the supporting frame, the first filter medium, and the second filter medium enclose an interior space in which the first filter element is arranged, and the first filter element is directly connected, in a fluid-conducting manner via the passage opening, to an exterior space that is exterior to the liquid filter.

2. The liquid filter of claim 1, wherein an end of the passage opening facing the exterior space of the liquid filter is delimited by the first front face of the supporting frame wall.

3. The liquid filter of claim 1, wherein an end of the passage opening facing the exterior space of the liquid filter is delimited by the supporting frame wall.

4. The liquid filter of claim 1, wherein the first filter element is spaced apart from the first filter medium facing the interior space and/or from the second filter medium facing the interior space.

5. The liquid filter of claim 1, wherein the first filter medium and the second filter medium are planar.

6. The liquid filter of claim 1, wherein the liquid is a fuel or a urea solution.

7. The liquid filter of claim 1, further comprising a support structure in an interior of the first filter element.

8. The liquid filter of claim 7, wherein the support structure includes:
- at least one support element that extends essentially in parallel to the first filter medium; and
- a plurality of ribs situated on the at least one support element and protruding from the at least one support element towards the first filter medium and/or the second filter medium.

9. The liquid filter of claim 1, wherein the first filter element includes a third filter medium.

10. The liquid filter of claim 9, wherein the first filter element includes a further supporting frame including a further supporting frame wall, wherein the further supporting frame wall includes a third front face to which the third filter medium is fastened in a fluid-tight manner.

11. The liquid filter of claim 10, wherein the further supporting frame encompasses a closed, fluid-impermeable bottom on a side facing away from the third front face, and the third front face faces upward in a normal installation position of the liquid filter.

12. The liquid filter of claim 1, wherein the exterior space is a raw side of the liquid filter.

13. The liquid filter of claim 12, wherein the first filter element is connected to the raw side in a fluid-conducting manner via the passage opening.

14. The liquid filter of claim 13, wherein the connection is a direct connection with no elements in between an interior of the first filter element and the raw side of the liquid filter.

15. A liquid filter for removing particles from a liquid, the liquid filter comprising:
- a first filter medium;
- a second filter medium;
- a first filter element and
- a supporting frame that encloses a passage opening and includes a supporting frame wall;

wherein:
- the supporting frame wall includes a first front face and a second front face facing away from each other;
- the first filter medium is fastened to the first front face in a fluid-tight manner;
- the second filter medium is fastened to the second front face in a fluid-tight manner; and
- the supporting frame, the first filter medium, and the second filter medium enclose an interior space in which the first filter element is arranged, and the first filter element is connected, in a fluid-conducting manner via the passage opening, to an exterior space that is exterior to the liquid filter, wherein
- the supporting frame includes a further passage opening; and
- the liquid filter includes a second filter element situated in the interior space and connected to the exterior space via the further passage opening.

16. A tank filter system for a motor vehicle, the tank filter system comprising a liquid filter for removing particles from a liquid, wherein the liquid filter comprises:
- a first filter medium;
- a second filter medium;
- a first filter element; and
- a supporting frame that encloses a passage opening and includes a supporting frame wall;

wherein:
- the supporting frame wall includes a first front face and a second front face facing away from each other;
- the first filter medium is fastened to the first front face in a fluid-tight manner;
- the second filter medium is fastened to the second front face in a fluid-tight manner; and
- the supporting frame, the first filter medium, and the second filter medium enclose an interior space in which the first filter element is arranged, and the first filter element is directly connected, in a fluid-conducting manner via the passage opening, to an exterior space that is exterior to the liquid filter.

* * * * *